United States Patent [19]

Ueda

[11] Patent Number: 4,467,787
[45] Date of Patent: Aug. 28, 1984

[54] STATIC SOLAR TRACKING MECHANISM

[76] Inventor: Naoaki Ueda, 3113 Cleary Ave., Metairie, La. 70002

[21] Appl. No.: 416,860

[22] Filed: Sep. 13, 1982

[51] Int. Cl.³ .......................... F24J 3/02; H05G 21/00
[52] U.S. Cl. .................................. 126/425; 250/491.1
[58] Field of Search ................................ 126/424, 425; 250/491.1, 203 R; 353/3; 136/89 PC

[56] References Cited

U.S. PATENT DOCUMENTS

| 3,070,643 | 12/1962 | Toulmin | 126/425 |
| 4,086,485 | 4/1978 | Kaplow et al. | 250/203 R |
| 4,102,326 | 7/1978 | Sommer | 126/424 |
| 4,137,897 | 2/1979 | Moore | 126/425 |
| 4,146,784 | 3/1979 | Yekutieli | 250/203 R |
| 4,146,785 | 3/1979 | Neale | 250/203 R |
| 4,179,612 | 12/1979 | Smith | 250/203 R |
| 4,211,922 | 7/1980 | Vaerewyck et al. | 250/203 R |
| 4,223,174 | 9/1980 | Moeller | 126/425 |
| 4,225,781 | 9/1980 | Hammons | 250/203 R |
| 4,267,441 | 5/1981 | Monk | 126/425 |
| 4,269,168 | 5/1981 | Johnson | 126/424 |
| 4,334,521 | 6/1982 | Jacoby | 126/425 |

FOREIGN PATENT DOCUMENTS 2116830  8/1974  France ............................ 250/203 R Primary Examiner—Samuel Scott
Assistant Examiner—G. Anderson
Attorney, Agent, or Firm—Charles C. Garvey, Jr.

[57] ABSTRACT

A solar tracking mechanism utilizes a semicircle collector trough body having an inner concave surface having a focal point at the center of the circle defined by the uppermost flat surface of the trough body, the upper flat portion of the trough body normally being generally horizontally disposed. A plurality of solar collection modules mounted in a matrix about said concave surface, each of the modules comprising a radial passageway formed in the concave surface along a line intersecting the focal point. A strip of thermally expandable material mounted in the passageway with normally open switch means positioned adjacent said thermally expandable strip for switching an electrical circuit between on/off positions respectively responsive to expansion/contraction of said strip.

5 Claims, 4 Drawing Figures

STATIC SOLAR TRACKING MECHANISM

BACKGROUND OF THE INVENTION

1. Field of the Invention

The present invention relates to solar energy and the collection of rays of solar energy and more particularly relates to an improved solar-radiation collection apparatus. More particularly, the present invention relates to a means for tracking the sun and indicating its position relative to the collector and thereafter identifying the position by means of an electrical switch which is activated by the solar rays themselves.

There is a need for devices to collect solar radiation and more particularly to assure that devices which collect solar radiation are properly oriented so as to maximize collection of the solar radiation by facing the sun directly. Generally, solar collectors have required structural rigidity and precise individual alignments of the various elements of a solar collecting array. Thus, it can be appreciated that if solar energy falls in a perpendicular fashion upon the surface of a solar cell, the energy conversion is at a maximum. The attitude and elevation of a flat solar panel can provide a known maximum conversion of solar energy over a given solar day throughout the year and thus generate a maximum watt hour per day. However, the number of solar cells required on a fixed flat panel for a usable power station, considering the various positions of the sun throughout the year is extremely large so that often a system for a given potential commercial or industrial or residential user is prohibitively expensive. Further, the size of such a system can be unusable requiring heavy structural frames and supports to provide adequate load carrying capabilities in view of the weight of such units as well as wind and snow load.

Thus, the use of a tracking mechanism to insure that the cells are directly perpendicular to the incoming sunlight solves many of the problems of static systems having poor incidents with the sunlight in a majority of time situations.

Many devices have been patented which have attempted to solve the problem of a solar radiation system which provides a sun tracking capability.

See, for example, U.S. Pat. No. 4,086,485 entitled "Solar Radiation Collection Apparatus with Tracking Circuitry".

A plurality of collectively controlled mirrors are used for concentrating solar radiation in U.S. Pat. No. 4,102,326 entitled "Central Receiver Solar Collector Using Mechanically Linked Mirrors".

U.S. Pat. No. 4,137,897 provides a "Unified Array for Collection and Concentration of Solar Energy". In that patent there is provided a support included a terraced support structure. A plurality of reflective collector elements are mounted on the terraced support in closely spaced apart relationship. Each of the collector elements are driven in a tracking relationship with the sunlight continuously reflecting energy toward an energy receiver.

A "Sun-Tracking Control System for Solar Collector" is the subject of U.S. Pat. No. 4,146,785.

In U.S. Pat. No. 4,146,784 a "Sun Tracking Device" is provided having an opaque housing with a photosensor located within the opaque housing. A reflector member is disposed within the housing and has an at least partly positively curved shaped position relative to the photosensor such that the rays of the sun striking it will be reflected onto the photosensor. An opening in the opaque housing together with the reflector member defines a minimum defined angle and a circuit connected to the photosensor is provided for utilizing output of the photosensor.

A "Radiation Tracking Control" is the subject of U.S. Pat. No. 4,179,612. In that patent photosensors receive incident radiation from the sun.

An edge means intercepts radiation directed toward each sensor so that a primary and secondary location on each sensor respectively receive and do not receive incident radiation and the sensors control the tracking movement of the apparatus. The sensors are electrically energized and have electrical outputs which vary a function of radiation interception by the sensors and there is provided means responsive to the outputs to control the tracking movement. A control means connected with the sensors and responsive to increases and decreases in the intensity of the radiation responsively decreases and increases electrical energization of the sensors.

A "Heliostat Guidance" apparatus is the subject of U.S. Pat. No. 4,211,922. In that patent, there is an apparatus for positioning a mirror to receive solar radiation from the sun onto a remote receiver and provides an apparatus for properly aiming the heliostat.

U.S. Pat. No. 4,223,174 provides a "Sun-Tracking Solar Energy Conversion System". In that patent, a number of solar energy converter assemblies are carried by a support frame which is mounted for independent rotation about a horizontal and vertical axis. Sensors detect the position of the sun; and control circuitry positions the support frame in elevation and azimuth so that converter assemblies track and face the sun whenever the sun incident energy is greater than a threshold level of about 25 percent of normal. Each converter assembly includes a solar cell and a multiangular conical concentrator shell for collecting, concentrating and directing incident solar energy onto the solar cell.

A solar tracking device which tracks the position of the sun using paired, partially shaded photocells is the subject of U.S. Pat. No. 4,225,781 entitled "Solar Tracking Apparatus". Auxiliary photocells are used for initial acquisition of the sun and for the suppression of false tracking when the sun is obscured by clouds.

U.S. Pat. No. 4,267,441 provides an "Energy Rays Tracking Device". In that patent, there is provided a receiver for fixing a position relative to the direction of maximum energy rays, a prime mover for maintaining the alignment of the receiver and an energy rays user, an energy rays tracker for controlling the power to the prime mover in response to the receiver, a timed tracker for controlling the prime mover when the energy rays tracker is not functioning due to energy rays being too diffused, an energy sensitive element for detecting the presence or absence of energy rays, and a power controller responsive to the energy sensitive element for repositioning the receiver and the energy rays user for the following period of tracking.

U.S. Pat. No. 4,269,168 provides a "Focusing Reflector Solar Energy Collector Apparatus and Method".

Many of these prior art devices are highly complex and would be expensive to construct and maintain. Many have dynamic-type tracking systems which require continual movement of the assembly in order to continue tracking of the sun.

Thus there is a need for a highly simplified solar tracking mechanism which will accurately and reasonably position the sun depending upon its position in the sky.

The present invention solves these prior art problems and shortcomings by providing a solar tracking mechanism which is by and large static and which provides a semispherical hollow collector trough body positioned with the flat uppermost surface of the semisphere substantially horizontal. The uppermost surface thus defines a circle having a center which likewise is a focal point for the innermost hollow portion of the collector trough which is concave and which provides a concave surface having the same focal point as the center of the circle.

A plurality of solar collection modules are mounted within the trough body in a matrix fashion. Each of the modules provides a radial passageway formed in the concave surface along a line intersecting the focal point. A strip of thermally expandable material, a photocell or the like, is mounted within the passageway. A normally open switch is positioned adjacent the thermally expandable strip or connected electrically to the photocell for switching an electrical circuit between on and off positions respectively responsive to expansion or contraction in the case of the thermally expandable strip. Thus, only proper alignment of the sun with a particular passageway will cause solar radiation to fall on the thermally expandable strip and actuate the strip. A shroud in the form of preferably a conically shaped thin wall structure can be provided having perforations therethrough for enhancing the directional definition of the sun's rays.

The above solar tracking mechanism could be used in combination with a computer with the switches being interfaced with the computer by the nature of their position in the array which lines the concave surface so as to give position information to the computer which could then be used to move an array of solar collectors into a desired position of incidents with the sunlight to maximize energy collection at a given time.

It is thus an object of the present invention to provide a solar tracking mechanism which is statis and highly simplified in operation and instruction.

Another object of the present invention is to provide a solar tracking mechanism which is compatible with a variety of solar collection devices.

Another object of the present invention is to provide a solar tracking mechanism which generates position information for use with a computer.

Another object of the present invention is to provide a solar tracking mechanism which generates electrical signals responsive to the position of the sun.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 2:
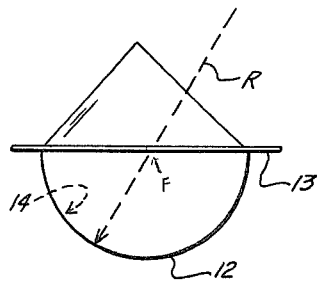
FIG. 2 is a sectional view of the preferred embodiment of the apparatus of the present invention illustrated an individual solar collection cell portion thereof.
Figure 3:
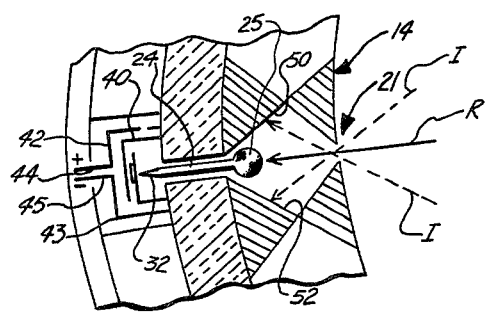
FIG. 3 illustrates a schematic solar collection system with which the present invention would be utilized, for example.
Figure 1:
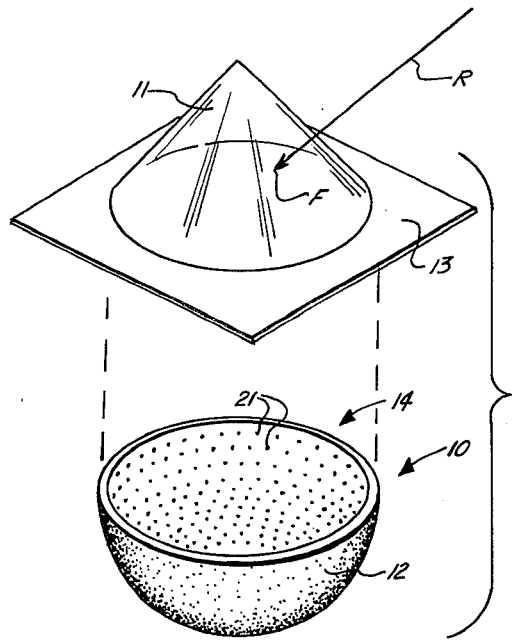
FIG. 1 is a schematic view of the preferred embodiment of the apparatus of the present invention.

FIGS. 1 through 3 best illustrate the preferred embodiment of the apparatus of the present invention designated generally by the numeral 10.

In FIGS. 1 and 2 there can be seen a solar collector 10 comprising conical transparent lid 11, baffle 13 and a collector body 12 which forms a hollow, hemispherical body 12 having a wall 15 with an inner concave surface 14 which as will be described more fully hereinafter is lined with a matrix of collection modules 20. An opening in baffle 13 defines focus F. Each of the modules 20 as best seen in FIG. 3 provides a radial passageway 21 formed in the concave surface 14 and receptive of sunlight rays R along the line intersecting the focus or focal point defined by F in FIGS. 1 and 2. A strip of thermally expandable material 24 (such as copper, steel or any other thermally expandable metal, for example) is provided in the passageway 21 with each passageway 21 intersecting the focal point. The strip 24 is enlarged at the end portion 25 proximate opening 21. A normally open switch 40 is positioned adjacent the innermost end 32 of the thermally expandable strip 24 for switching an electrical current responsive to expansion and contraction of the strip. Switch 40 is activated between on and off positions respectively responsive to expansion and contraction respectively of the strip 24 which presses contacts 42, 43 together, each contact connected to terminals 44, 45 respectively. Since passageways 21 are aligned to receive only solar rays R intersecting focal point F, only a single given module would be activated at a single time thus providing information from its associated switch with regard to solar placement. Indirect rays I would hit non-reflective surfaces 50, 52 rather than strip 24 at 25 and thus not expand the strip.

The switch information could, for example, be interfaced with a computer 100 to give the position of the sun which could then be used to activate any type of motorized solar collection device motor 105 to move a collector so that the incidence of sun rays R falling on it would be at a perpendicular angle thus maximizing solar collection.

Figure 4:
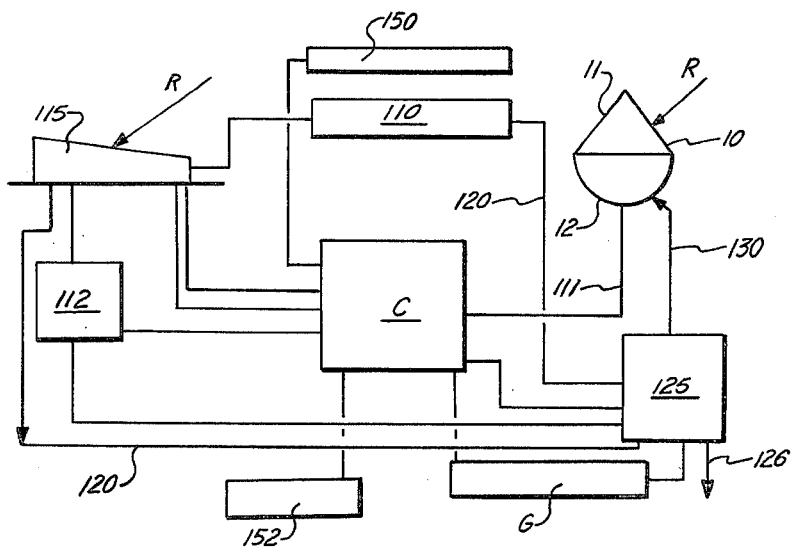
FIG. 4 is an exemplary solar collection system illustrating use of the solar tracking apparatus of the present invention.

FIG. 4 shows a typical exemplary solar collection system for illustrating a use of solar tracking apparatus 10. Line 111 connects tracking mechanism 10 and individual modules 20 to a computer control C. The sun track mechanism 10 would thus give the computer information with regard to the sun location using the various electrical sensor modules 20 as aforementioned which would maxtrixed about inner surface 14 as aforementioned.

Computer control 100 would also be connected to any drive mechanism for running a plurality of multi-position collectors 115 which drive mechanisms designated 110. Solar energy collected at 115 would be transmitted via line 120 to battery 125 for storage. From battery 125, of course, through line 126 power could be used in any desirable fashion such as, for example, to power a home or the like.

Battery 125 could likewise power parts of the overall system including the electrical sensors 20 through line 130 if additional auxiliary power such as electromagnetic power were needed to enhance the switching operation or to amplify signals, drive and control system 112, and computer C. Power to operate the drive mechanism 110 could be supplied through line 120 to operate various motors which would place individual collector panels perpendicular to solar rays and thus maximize solar energy collection. Thermometers 150, 152 could monitor (and computer input for studies) ambient temperature, collector temperature, or any other such temperature parameter in the system. A generator could supplement the system to charge batteries 125 when computer C indicated a need for auxiliary power in periods of little or no solar energy available for collection.

Because many varying and different embodiments may be made with the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A solar tracking mechanism comprising:
   a. a semispherical collector body having an inner concave surface with a center focal point;
   b. a plurality of solar collection modules mounted within the body on the concave surface in a matrix with each of the modules having a passageway that communicates with the concave surface, each passageway aligning with a radius of the concave surface center focal point;
   c. a strip of thermally expandable material mounted within the passageway;
   d. switch means associated with the thermal strip and positioned adjacent thereto so that expansion and contraction of the thermally expandable strip actuates the switch responsively between on and off positions.

2. The apparatus of claim 1 further comprising a conical shroud having a thin conical wall provided with a matrix of perforations therethrough, said shroud having a circular base corresponding to the uppermost circular surface of said body.

3. The apparatus of claim 1 further comprising a mounting plate position beneath said shroud and above said trough defining a support therebetween.

4. The apparatus of claim 1 wherein said strip of material is metallic.

5. The apparatus of claim 1 wherein said passageway provides a narrow opening communicating with said concave surface and an inner expanded section line with non-reflective material.

* * * * *